(12) United States Patent
Desgagne et al.

(10) Patent No.: US 6,295,453 B1
(45) Date of Patent: Sep. 25, 2001

(54) MULTI-FULL RATE CHANNEL ASSIGNMENT FOR A CELLULAR TELEPHONE SYSTEM

(75) Inventors: Michel Desgagne, St-Hubert; Matthieu Lachance, Outremont, both of (CA)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/167,752

(22) Filed: Oct. 7, 1998

(51) Int. Cl.$^7$ ............................. H04Q 7/20; H04J 3/06; H04B 7/212

(52) U.S. Cl. ................... 455/448; 370/342; 370/347; 455/450; 455/453

(58) Field of Search ........................... 455/452, 453, 455/436, 450, 34.2, 448; 370/433, 468, 342, 347

(56) References Cited

U.S. PATENT DOCUMENTS

| | | | |
|---|---|---|---|
| 4,355,397 | * 10/1982 | Stuart . | |
| 4,455,651 | * 6/1984 | Baran . | |
| 4,759,016 | * 7/1988 | Otsuka . | |
| 5,303,297 | * 4/1994 | Hillis | 379/63 |
| 5,388,097 | * 2/1995 | Baugher | 370/85.5 |
| 5,471,645 | * 11/1995 | Felix | 455/34.2 |
| 5,542,093 | 7/1996 | Bodin et al. | 455/33.2 |
| 5,592,469 | * 1/1997 | Szabo | 370/342 |
| 5,649,299 | 7/1997 | Battin et al. | 455/62 |
| 5,867,789 | * 2/1999 | Olds | 455/453 |
| 5,940,763 | * 8/1999 | Alperovich | 455/450 |
| 6,028,854 | * 2/2000 | Raith | 370/347 |
| 6,122,514 | * 9/2000 | Spaur | 455/448 |

FOREIGN PATENT DOCUMENTS

WO 94/05130   3/1994   (WO) .
WO 96/10320   4/1996   (WO) .

OTHER PUBLICATIONS

ISR for PCT/SE 99/0161; completed Feb. 18, 2000.

Ivanovich, et al, Channel Allocation Methods for Half and Full Rate Connections in GSM, IEEE, Jun. 23, 1996, pp. 1756–1760.

Iera, et al, Transport and Control Issues in Multimedia Wireless Networks, J.C. Baltzer AG, Science Publishers, Wireless Networks 2 (1996), pp. 249–261.

Rappaport et al, Prioritized Resource Assignment for Mobile Cellular Communication Systems with Mixed Services and Platform Types, IEEE Transactions on Vehicular Technology, vol. 45, No. 3, Aug, 1996, pp. 443–458.

* cited by examiner

Primary Examiner—William Cumming
(74) Attorney, Agent, or Firm—Jenkens & Gilchrist (57) ABSTRACT

Cellular telephone systems may have to handle high rate data calls that utilize multiple full rate channels within a frequency. It is important to increase the availability of the system for these high rate data calls while maintaining the quality of the radio links within the cellular radio network. A first sort is performed to find full rate channels that meet a requested call service type below the operator allowed cost threshold related to the radio conditions. Using the previously sorted FR channels, a second sort is performed to find the multi-full rate channel combinations that meet a requested call service rate. The call is then assigned to the found channel combination with the lowest cost. Otherwise, the system reduces the requested service rate of the call and attempts to place the call into a multi-full rate channel combination channel again. If the call has reached the minimum acceptable service rate, the system reduces an existing high rate call, and attempts to place the call into a multi-full rate channel combination. Additional functionality allows the system to perform intra-cell or intra-frequency hand-offs.

13 Claims, 8 Drawing Sheets

MULTI-FULL RATE CHANNEL ASSIGNMENT FOR A CELLULAR TELEPHONE SYSTEM

BACKGROUND OF THE INVENTION

1. Technical Field of the Invention

The present invention relates to cellular telephone systems, and, in particular, to a method for selection and assignment of traffic channels to a multiple full rate call.

2. Description of Related Art

Cellular telephone systems divide a large service area into a number of smaller discrete geographical areas called "cells" each typically ranging in size from about one-half to about twenty kilometers in diameter. Each cell is contiguous with multiple adjacent cells to provide continuous coverage throughout the service area. A base station including a plurality of transceivers capable of operating independently on different radio frequencies is provided for each of the cells. Via the transceivers, the base stations engage in simultaneous communications with plural mobile stations operating within the area of the associated cell. The base stations further communicate via data links (and voice trunks) with a central control station, commonly referred to as a mobile switching center, which functions to selectively connect telephone calls to and from the mobile stations through the base stations and, in general, control operation of the system.

Each cell is allocated the use of a predetermined set of frequencies, wherein each frequency comprises a physical channel supporting a plurality of logical channels (i.e., time slots) therein. The availability of multiple frequencies per cell, with multiple logical channels per frequency, permits base stations to simultaneously handle many telephone conversations with many mobile stations. The frequencies allocated to a cell are preferably spaced apart across the frequency spectrum of the cellular band. This serves to minimize the instances of adjacent channel interference.

Because only a limited number of frequencies are available in the cellular band, an allocation of the same frequencies is repeated (i.e., reused) in other cells in a distant part of large service areas with many cells. No adjacent cells, however, are assigned the same frequency. Furthermore, the power levels of the signal transmissions on any given frequency are limited in strength. The foregoing precautions serve to minimize the likelihood of co-channel interference caused by reuse of that same frequency in a distant cell.

The mobile switching center further functions to dynamically assign the traffic channels available in any one cell among the plurality of mobile stations located within the cell area that desire communications. In this regard, the traffic channels comprise time slots in digital time division multiple access (TDMA) formatted frequencies which are allocated to the cell. Commands that assign a logical channel for a mobile station use a certain digital traffic channel assigned to a given cell and are transmitted from the mobile switching center to the base station for that cell. The commands are then relayed by the base station to the certain mobile station over one of the channels to direct mobile station selection of the assigned traffic channel for handling the call.

Assignment by the mobile switching center of a particular digital traffic channel to a particular mobile station for carrying a cellular communication (i.e., a call) primarily occurs in three instances. The first instance is at call set-up when the subscriber activates the mobile station to initiate a call and the system selects for assignment the traffic channel to carry that new call. The second instance is at call hand-off when the subscriber, while engaged in a call, moves from one cell in the service area to another cell, and the system selects for assignment the traffic channel in the new cell that will continue the handling of the on-going call. The third instance is at an intra-cell hand-off, which occurs when signal strength is good, but quality is bad. In all three cases, it is important that the traffic channel selected for assignment at call set-up or hand-off be of the highest quality possible.

Conventionally, the selection and assignment by the system of a traffic channel to carry a call has been performed by randomly choosing a logical channel from the available (idle) digital traffic channels allocated to the cell currently serving the mobile station. Alternatively, the system maintained a record of historic traffic channel use for each cell (normally in the form of a FIFO queue), and the traffic channel selected to carry the call was the channel allocated to that cell that had not been assigned for mobile station calling use in the longest period of time. While each of these selection methods was successful in assigning a traffic channel to a mobile station for carrying the call, the selection failed to take into consideration whether the traffic channel is the best quality channel available to carry the call.

An improved prior art method for assigning traffic channels to carry a call in response to a call set-up, or hand-off gave primary consideration to whether the traffic channel was the best quality channel, based upon a set of metrics, available to carry the call. Examples of such metrics used to evaluate channel quality include: interference level on the uplink or downlink, power levels used by the mobile and base stations, and efficient logical channel usage (i.e., frequency packing). One known method for metric-based quality channel selection comprises interference driven channel selection (IDCS). Signal strength measurements are made by a signal strength measurement device in each cell base station on those frequencies allocated to that cell which have idle traffic channels. From these measurements, the injected uplink interference (comprising either adjacent channel, co-channel, or other type of interference) on the frequencies for each of the idle traffic channels is determined and reported to the mobile switching center. The reported interference measurements are then sorted in relative order of idle traffic channels having the best measured interference to the worst measured interference. The sorted list is then used by the system in selecting, for a base station, a traffic channel from the frequency with the best interference for assignment at call set-up or call hand-off.

A voice communication normally occupies only a single logical channel. This is referred to as a full rate (FR) channel call. A single full rate channel may not, however, have sufficient bandwidth to efficiently support some kinds of data communications. These communications may be better (and perhaps only) handled by simultaneously using plural logical channels. This is referred to as a multi-full rate channel call. It is recognized that different cellular systems utilize a different number of time slots per full rate channel, and further support a different maximum number of full rate channels (nFR) within a frequency channel.

There is a need for a system to intelligently assign multi-full rate calls, up to nFR, to available traffic channels. Preferably, such a system would take advantage of metric-based quality channel selection in making these call assignments.

SUMMARY OF THE INVENTION

Calls handled by a cellular phone system specify whether they request multiple full rate service. These calls are assigned to traffic channels by a process that first sorts the available and acceptable traffic channels for a cell. Second, sorts the first sort identified full rate channels into multi-full rate channel combinations meeting the requested service rate. Third, assigns the call in that cell to one of the second sort identified multi-full rate channel combinations.

More specifically, the multi-full rate channel assignment process of the present invention responds to a received call request by performing a full rate channel sort to identify available full rate channels that meet a requested service type (comprising frequency band, modulation parameters, and potentially any other radio link parameters) below an operator allowed cost threshold related to measured radio condition metrics. A multi-full rate sort is then performed on the identified full rate channels found in the full rate sort to identify the multi-full rate channel combinations that meet a requested service rate for the call request. The requested call is then assigned to one of the identified multi-full rate channel combinations. If a multi-full rate channel combination cannot be found, the service rate for the call is lowered and the multi-full rate sort is repeated in an attempt to find a suitable channel combination for the call. Alternatively, the existing multi-full rate calls currently being handled are checked to determined if they satisfy the cost threshold, can be degraded, and meet the call type requirement. If an existing call is found based upon these requirements, the one with the lowest cost is rate degraded to make additional full rate channel(s) available for the call. Additional functionality allows the system to perform intra-cell or intra-frequency hand-off. This functionality allows the system to place high rate calls without degrading the service rate by reallocating the existing calls, thereby making the frequency and time slot usage more efficient.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

There are a plurality of radio frequencies in the cellular band available to cellular telephone system providers for use in communicating with mobile stations. These radio frequencies support both traffic channels and control channels. The traffic channels are used for carrying telephone voice or data conversations. The control channels are used for carrying system operation control signals (commands). Such control signals include page signals, page response signals, location registration signals, traffic channel assignments, maintenance instructions, and cell selection or re-selection instructions.

A cellular service area can cover a large geographic area, and in many instances there will be a need for a large number of cells that often exceeds in number the number of cells provided by dividing the available radio frequencies in such a manner as to handle expected subscriber usage. Accordingly, in order to provide sufficient call handling capacity throughout the service area, the cells are grouped into clusters of cells and the radio frequencies in the cellular band are reused in each of the clusters.

Figure 1:
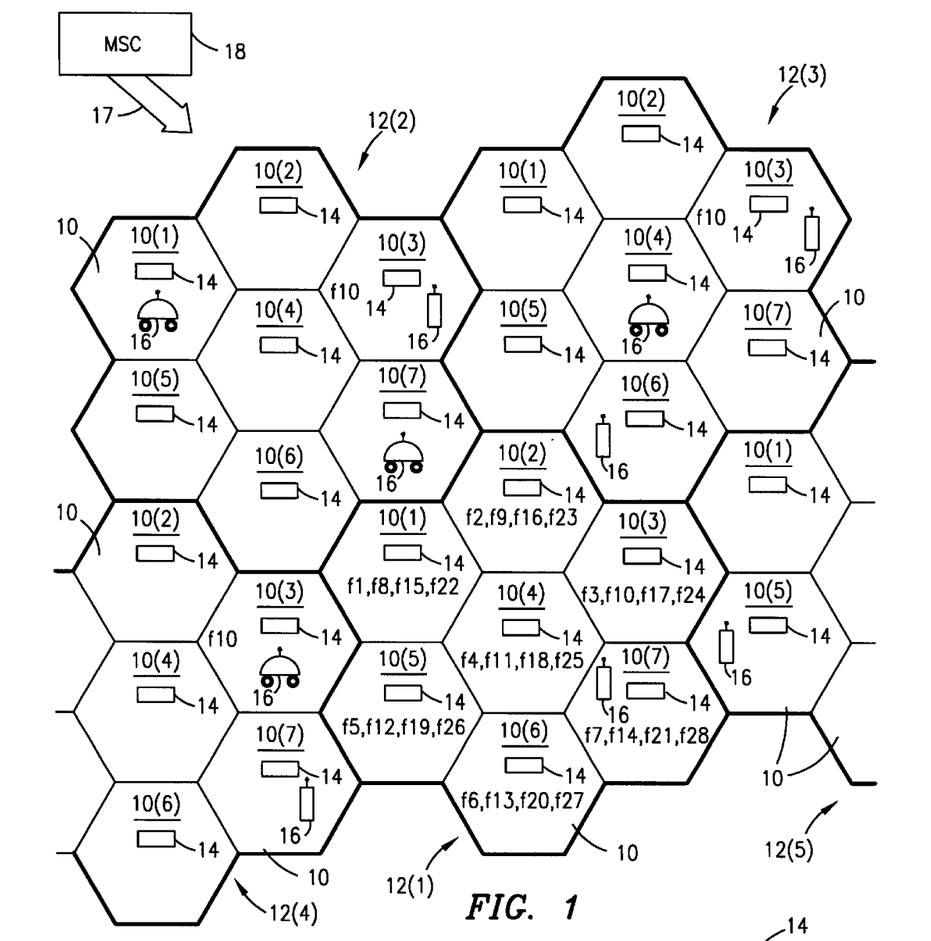
FIG. 1 is an exemplary cell diagram schematically illustrating a frequency reuse cellular telephone system wherein the present invention is implemented.

Reference is now made to FIG. 1 for an illustration of an example of the frequency reuse concept commonly utilized in cellular systems. An arbitrary geographic area (hereinafter "the service area") is divided into a plurality of contiguous cells 10 schematically represented by hexagons. The cells 10 are then grouped into clusters 12 (outlined in bold to ease recognition), which in the present example comprise seven cells 10(1)–10(7) in each cluster. Assume for this example that there are a total of twenty-eight frequencies fn (wherein n=1 to 28) available in the cellular band. It will of course be understood that each frequency actually comprises a paired uplink and downlink frequency. The frequencies f1–f28 are divided equally amongst the cells 10(1)–10(7) to provide four frequencies per cell. Thus, each of the cells 10(1) in the service area is allocated frequencies f1, f8, f15 and f22 for carrying its traffic and control channels. Similar assignments are made for each of the remaining cells 10, with the frequencies also being reused across each of the included clusters 12. The complete allocation of the frequencies f1–f28 to the cells 10(1)–10(7) in each cluster 12 in accordance with this example of cellular frequency reuse is illustrated in detail in FIG. 1 with respect to cluster 12(1).

It is noted in this frequency reuse scheme that in no instance have adjacent cells been allocated use of the same frequency. Reuse of an identical frequency in the service area at a minimum requires a separation of at least one cell 10 along with a regulation of broadcast power from each cell to constrain radio propagation substantially within the cell area. Furthermore, it is noted that in no instance does. any one cell 10 utilize adjacent frequencies in the cellular band. Adjacent frequencies should exist no closer than one cell 10 away from each other. By arranging the cells 10 in clusters 12 as shown in the figure, regulating broadcast power of communications within the cell, and further by allocating frequencies in the fashion described above and shown in the figure, the likelihood of interference is minimized while simultaneously providing effective and efficient cellular communications services across a very large service area.

In spite of the precautions taken to avoid interference, it is known that interference does occur in cellular systems like that previously described. One aspect of this interference originates from communications occurring in the cells of other clusters 12 on the same frequency (i.e., co-channel interference). To understand this phenomena, assume the existence of concurrent voice communications using frequency f10 (and perhaps individual time slots therein) in each of the cells 10(3) in each of the clusters 12(2), 12(3) and 12(4) as shown in FIG. 1. In spite of any imposed broadcast power limitations, a certain amount of the radio frequency energy of those voice communications propagates beyond the respective cell boundaries and is injected as interference into frequency f10 in cell 10(3) of cluster 12(1).

Another aspect of this injected interference originates from communications occurring in other cells on adjacent frequencies (i.e., adjacent channel interference). To understand this phenomena, assume the existence of concurrent voice communications on frequency f8 in cell 10(1) and frequency f9 in cell 10(2), and perhaps individual time slots therein, of cluster 12(1) as shown in FIG. 1. In spite of any regulations on broadcast power and the presence of guard bands around each of the frequencies, improper transceiver broadcasts around one frequency (for example, f8) may be injected as interference into the adjacent frequency f9. It should be recognized that adjacent channel interference is not nearly as common an occurrence as co-channel interference in well regulated and stable communication systems.

Because this injected interference may adversely affect cellular voice or data communications over a given frequency, it would be unwise for the system to act during certain times of high interference by assigning that given frequency (or channel therein) to a mobile station at either call set-up or hand-off to carry a cellular voice or data communication. Unfortunately, the prior art random or queued channel selection methods fail to obtain knowledge of and consider such injected interference and its adverse effects in selecting single or multiple time slots and assigning a voice or data channel (comprising time slot(s) within the frequency) during either call setup or hand-off. Another prior art method considers whether a traffic channel is of the best quality (i.e., least injected interference) before selecting it to handle the call. This interference driven channel selection (IDCS) method is an improvement over random or queued selection, but IDCS focuses the selection process on finding the best (i.e., least interfered) full rate (FR) channel. No consideration is given to finding the best possible combination of full rate channels to support a multiple FR channel call.

Each of the cells 10 in a cellular system such as that illustrated in FIG. 1 includes at least one base station (BS) 14 configured to facilitate radio frequency communications with mobile stations 16 roaming throughout the service area. The base stations 14 are illustrated as being located at or near the center of each of the cells 10. However, depending on geography and other known factors, the base stations 14 may instead be located at or near the periphery of, or otherwise away from the centers of, each of the cells 10. In such instances, the base stations 14 may broadcast and communicate with mobile stations 16 located within the cells 10 using directional rather than omni-directional antennas. The base stations 14 are connected by communications links (illustrated schematically by arrow 17) to at least one mobile switching center (MSC) 18 operating to control the operation of the system for providing cellular communications with the mobile stations 14.

Figure 2:
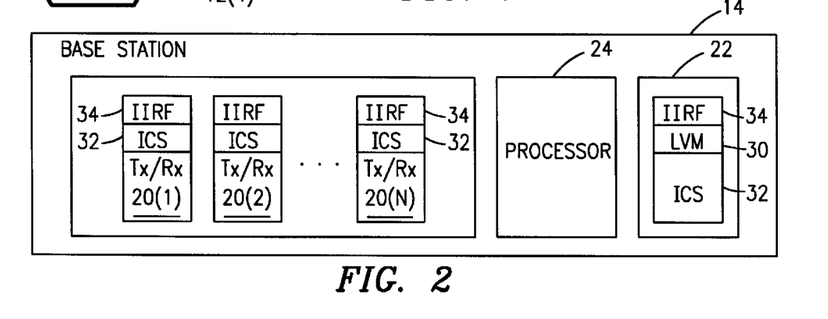
FIG. 2 is a simplified block diagram of a base station in accordance with the present invention for use in the frequency reuse cellular telephone system of FIG. 1.

Reference is now additionally made to FIG. 2 wherein there is shown a simplified block diagram of a base station 14 used in the system of FIG. 1 in accordance with the present invention. The base station 14 includes a plurality of transceivers (Tx/Rx) 20(1) through 20(N), wherein N is the number of frequencies allocated to the cell 10 served by the base station. In the exemplary system shown in FIG. 1, N=4 wherein seven cells 10 are included in each cluster 12 and a total of twenty-eight available radio frequencies are included in the cellular band. The transceivers 20 have a configuration known in the art that includes a transmitter and a receiver tuned to operate on one of the frequencies allocated to the base station 14 for its traffic and/or control channels. Each allocated frequency provides a plurality of digital TDMA channels (i.e., plural full rate (FR) channels) for mobile station use.

The base station 14 also includes a signal strength measurement device 22 that is used in one mode known in the art during hand-off to measure the signal strength of communications on the frequency channels assigned to and used by other cells. The operation of the signal strength measurement device 22 of each base station 14 is further controlled in an additional operating mode by received mobile switching center commands and/or the base station programming to measure the signal strength of communications on each of the frequencies supporting idle traffic channels allocated to the base station. These measurements are made at selected times or are made periodically in accordance with system specifications. The results of the idle channel measurements provide an indication of the amount of injected uplink interference caused by same or adjacent channel communications occurring simultaneously within the system, or caused by any other interference source. The idle traffic channel signal strength measurements comprising the measured uplink interference (on either a frequency or time slot basis) are reported by the signal strength measurement device 22 of the base station 14 to the mobile switching center 18 (perhaps along with the hand-off traffic channel signal strength measurements made on the frequencies/channels allocated to other cells) and are considered in connection with the process for selecting and assigning one or more full rate channels at either call set-up or hand-off. Alternatively, a processor 24 within the base station 14 may receive the measured uplink interference (on either a frequency or time slot basis) for processing to select and assign one or more full rate channels at either call set-up or hand-off.

In one embodiment of the base station, the signal strength measurement device 22 comprises a locating verification module (LVM) 30 including a receiver and frequency synthesizer for selectively tuning to any one of the frequencies available in the cellular band. As each of the frequencies allocated to a cell 12 is subdivided into a plurality of time slots comprising the traffic channels, the locating verification module 30 further includes a circuit (not explicitly shown) for synchronizing operation of the module to the TDMA communications protocol being implemented by the system so that the signal strength measurements on a selected frequency may be made during each of the plurality of included time slots therein. This would include not only the frequencies/time slots allocated to and used by other cells, but also the frequencies/time slots allocated to and used by the cell served by the base station 14. The signal strength measurements made by the locating verification module 30 are then filtered by an infinite impulse response filter (IIRF) 34 before being subsequently processed in accordance with the present invention. The filtering removes fast changes in the measured interference levels to provide a stable estimate for output and subsequent processing. With respect to the implementation of the present invention, the idle channel supervision functionality 32 makes and reports measurements made on the frequencies/time slots associated with idle traffic channels in order to supply uplink interference measurement data.

In another embodiment of the base station, the signal strength measurement device 22 comprises an idle channel supervision (ICS) functionality 32 associated with each transceiver 20. The idle channel supervision functionality 32 advantageously uses the receiver portion of the transceiver 20 to make the uplink signal strength measurements. This idle channel supervision functionality 32 may include a circuit (not explicitly shown) for synchronizing measurement operation to the TDMA communications protocol being implemented by the system so that the signal strength measurements on a selected frequency may be made during each of the plurality of included time slots therein. The idle channel supervision functionality 32 makes and reports measurements made on the frequencies/time slots associated with idle traffic channels in order to supply uplink interference measurement data. In addition to interference measurement data, other metrics, such as power levels and time slot usage can be utilized to assess frequency channel availability.

The base stations report signal strength measurements on a per idle time slot basis to either the processor 24 or the mobile switching center for processing. The measurement processing means comprising either the processor 24 or the mobile switching center then makes intelligent single and multiple full rate channel assignments with respect to minimizing interference concerns (for example, by choosing one or more least interfered idle full rate channels within a selected frequency). Alternatively, the base stations process the signal strength measurements made on a per idle time slot basis to obtain an interference measure for the frequency (i.e., the carrier). It is this carrier based interference measurement that is reported to the processing means comprising either the processor 24 or the mobile switching center. The processor 24 or mobile switching center then makes intelligent single and multiple full rate channel assignments with respect to minimizing interference concerns by (for example, by choosing one or more idle full rate channels within a least interfered selected frequency).

Figure 3A:
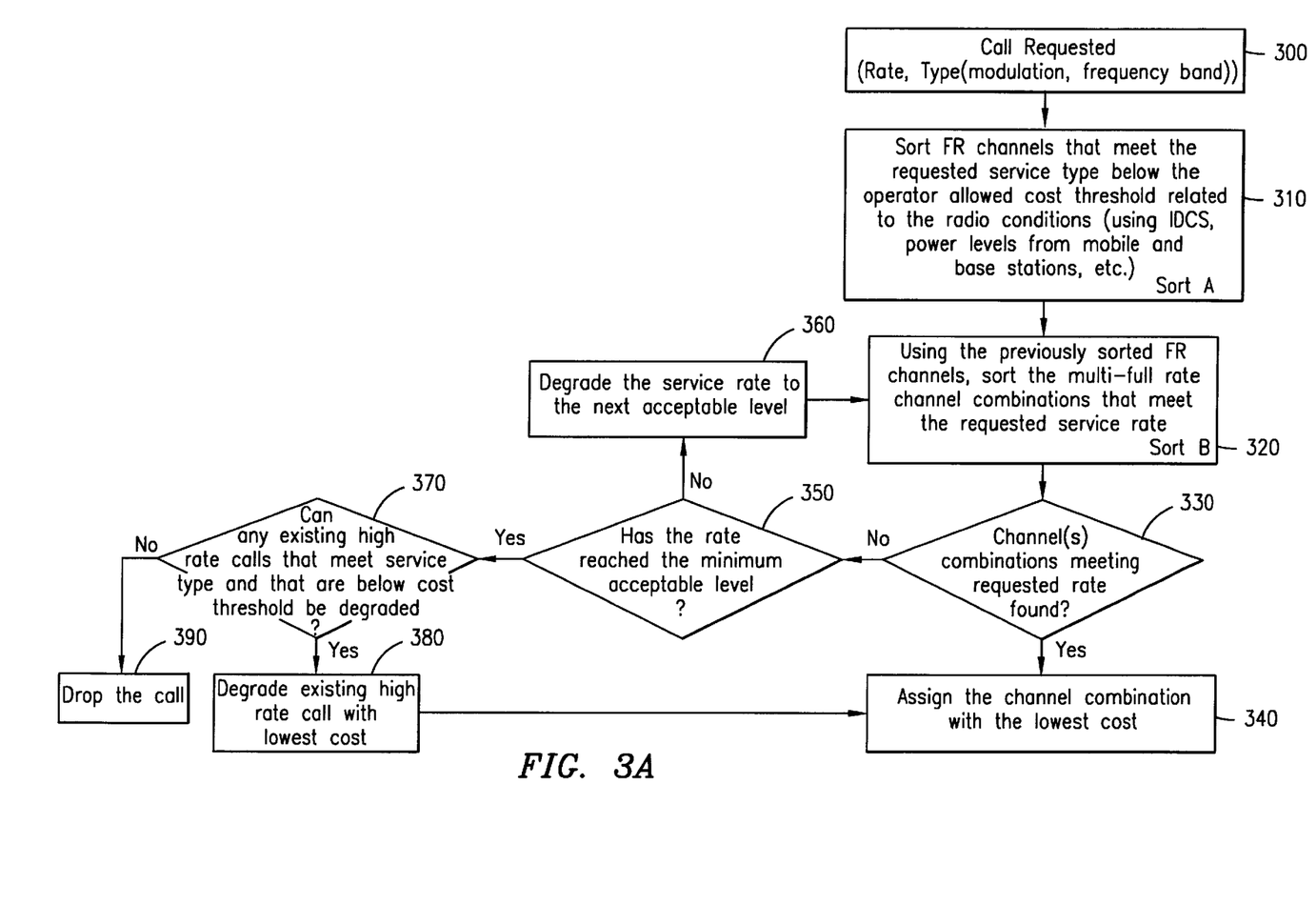
FIG. 3A is a first embodiment flow diagram illustrating the method of operation for a multi-full rate channel assignment process (MFRCAP) in accordance with the present invention.

Reference is now made to FIG. 3A wherein there is shown a flow diagram illustrating operation of a Multi-Full Rate Channel Assignment Process (MFRCAP) in accordance with the present invention. At any given moment in time, a call 300 may be requested in connection with either, for example, an initial call set up or an existing call hand-off. This requested call 300 includes parameters specifying a certain service rate and type. The service rate identifies the number of full rate channels requested for the call 300, up to nFR channels (wherein n is the maximum number of full rate channels supporting within each frequency). Additionally, the service rate may further identify a minimum service rate (i.e., number of full rate channels) required for the call 300. Alternatively, this minimum service rate parameter may be specified by the cellular system operator. The service type for the call 300 identifies a preferred modulation and frequency band requested for the call 300.

In response to the call 300 request, a FR channel sort is performed in step 310. The FR channel sort of step 310 identifies the available (idle) FR channels in the cell, both that meet the service type of the call 300 and that are below an operator allowed cost threshold related to the measured radio conditions. Interference Driven Channel Selection (IDCS) or some other metric-based quality channel selection method may be used to measure cost as a function of measured metrics such as interference levels, power levels used by the mobile and base stations, and time slot usage. The operator allowed cost threshold expresses the maximum cost acceptable to the system. The cost threshold is a cell parameter controlled by the operator. There can be several defined thresholds based upon different metrics or a single threshold that represents the cumulative measured metric values. A low threshold will be more restrictive in assigning FR channels and will therefore put the emphasis on radio quality, while a high threshold will put the emphasis on giving the requested service to the user even if radio quality is not optimum. The sort process of step 310, in general, finds the idle FR channels in the cell that have the proper frequency band and modulation types (as specified by the service type) and further have a measured cost that is below the cumulative metric cost threshold. If a single FR channel has a measured cost exceeding the specified cost threshold, the sort of step 310 does not consider that full rate slot, or any other idle full rate slot within the frequency.

A multi-full rate channel sort is next performed in step 320 to sort the available (idle) FR channels identified in step 310 into multi-full rate channel combinations that meet the requested service rate for the call 300. The process performed by step 320 logically determines whether a channel with idle acceptable cost FR channels found in step 310 has enough FR channel capacity available to meet the requested service rate. The logical determination for FR channel capacity availability is based upon the step 310 sort that identified the current FR channel usage within particular frequency and radio condition metrics measured by the IDCS function or another metric-based quality measuring function known in the art. Any given frequency incapable of providing a multi-full rate channel combination meeting the requested service rate for the call 300 is deemed an unacceptable frequency by the multi-full rate channel sort 320. For example, a frequency with an acceptable step 310 cost with only two available (idle) FR channels would not satisfy step 320 with respect to a call 300 requesting a triple full rate (3FR) service rate. Conversely, that same frequency would satisfy step 320 with respect to a call 300 requesting either a single full rate (FR) or double full rate (2FR) service rate.

Next, the step 330 request rate logic process determines from the sorted multi-full rate channel combinations produced in step 320 whether any multi-full rate channel combinations are available to support the call 300. For an affirmative result of step 330 (i.e., at least one multi-full rate channel combination exists that can support the call 300), the process proceeds to step 340. In step 340, the call 300 is assigned to the requisite full rate channel(s) of the frequency supporting one of the found multi-full rate channel combinations that has the lowest measured cost.

For a negative result of step 330 (i.e., no multi-full rate channel combinations exist that can support the call 300), the process proceeds to step 350. In step 350, a minimum rate logic process determines whether the specified service rate for the call 300 has reached its minimum acceptable level. The process of step 350 inspects the call 300 current service rate and compares that service rate to the minimum acceptable service rate. The minimum acceptable service rate may be set by the operator. If the call 300 rate has not reached the minimum acceptable level, then the process degrades the service rate to the next acceptable level (for example, from 3FR to 2FR) in step 360. Following the service level degradation in step 360, the process returns to step 320 to execute another sort to find multi-full rate channel combinations meeting the reduced service rate requirement for the call 300. The process then determines in step 330 whether any satisfactory multi-full rate channel combinations are found. As an example, if a first pass through step 320 sorted the multi-full rate channel combinations to meet a requested 3FR requirement, following call 300 degradation in step 360, the next pass would sort the multi-full rate channel combinations to meet a 2FR requirement. This looping process continues until the call 300 is either assigned to a frequency channel in step 340 or a determination is made in step 350 that the minimum acceptable service rate for the call 300 has been reached.

Following a step 350 determination that the call 300 has reached its minimum acceptable service rate level, the process next proceeds to execute a high rate call degradation logic in step 370. In step 370, the process performs a search on existing calls being routed through the base station 14 to find out if any currently handled high rate calls (i.e., 2FR to nFR) can be degraded in rate to an extent necessary to free up full rate channel(s) to meet the call 300 type. An existing call in the cellular system can be degraded to a reduced service rate if its present service rate is above the minimum acceptable service rate for that existing call. If no such high rate calls exist that are suitable for service rate degradation, the process proceeds to step 390 and the call 300 is dropped (i.e., denied service).

If the step 370 logic determines, however, that at least one such existing high rate call is suitable for service rate degradation, step 380 degrades the existing high rate call with the lowest associated cost and matching call 300 type. After a high rate call is degraded in step 380, the call 300 is assigned 340 to the full rate channel(s) produced from degrading the existing call.

Figure 3B:
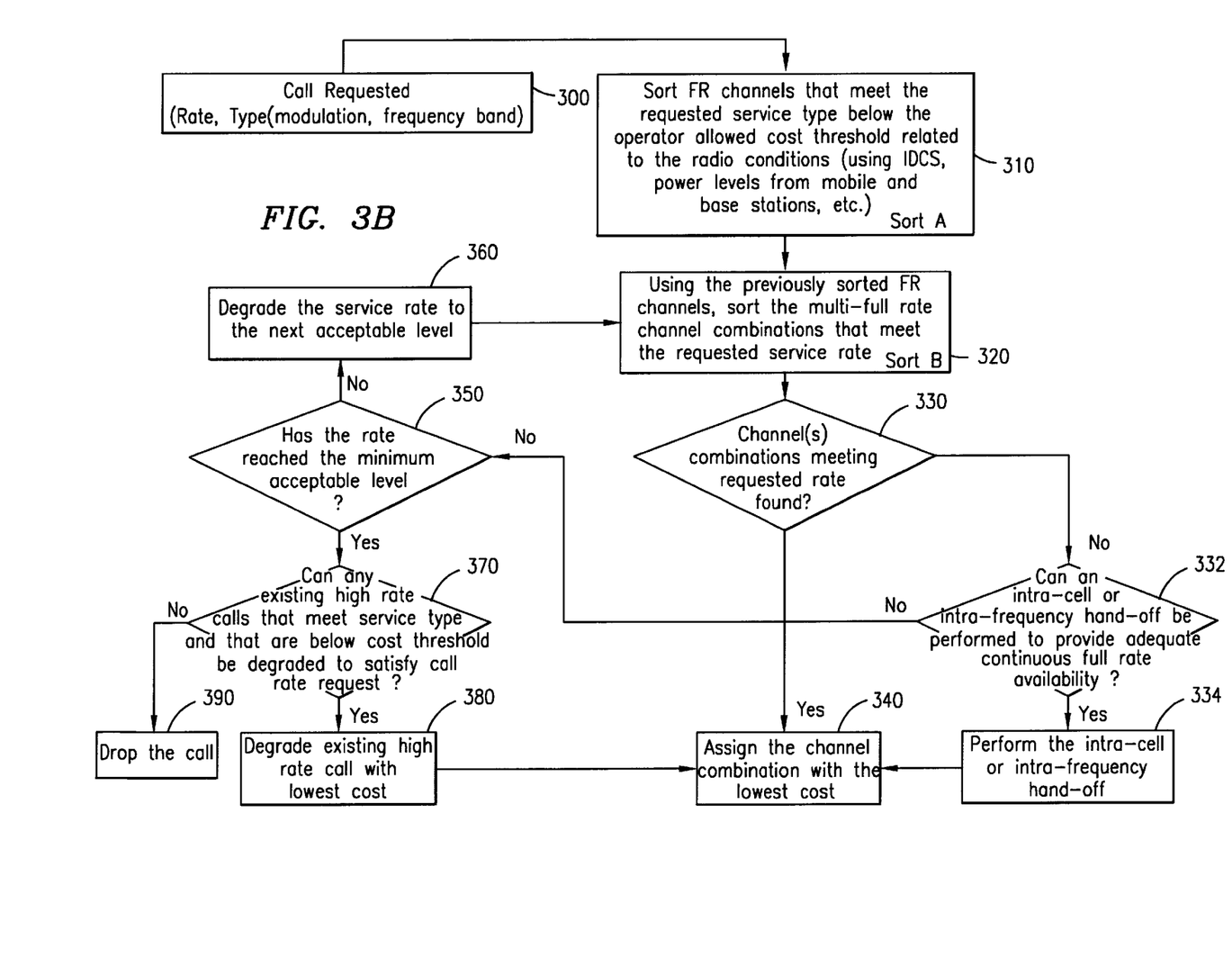
FIG. 3B is a second embodiment flow diagram illustrating the method of operation for a multi-full rate channel assignment process (MFRCAP) that incorporates intra-cell and intra-frequency hand-off functionality in accordance with the present invention.

Reference is now made to FIG. 3B wherein there is shown a flow diagram for a second embodiment of the MFRCAP present invention. This embodiment comprises the same steps as FIG. 3A with added functionality to include the ability to perform intra-cell (i.e., inter-frequency) and intra-frequency hand-offs to free up full rate channel(s) for assignment. After the multi-full rate sort of step 300, if no channel combinations meeting the requested rate are found, a decision is made in step 332 as to whether an intra-cell or intra-frequency hand-off can be performed to provide adequate full rate availability. If adequate full rate availability can be found by performing an intra-cell or intra-frequency hand-off in step 332, then an intra-cell or intra-frequency hand-of is performed in step 334 and the call 300 is placed into the newly available channel combination in step 340. Note that for a system that does not support non-contiguous multiple full rate channels, the sort algorithm should drop non-contiguous combinations.

Although not shown, step 380 (previously described in connection with FIG. 3A) may also include the ability to perform an intra-cell hand-off. If the frequency carrying the degraded call could not satisfy the required rate of the call 300, the degraded existing call can be handed off to another frequency within the cell 10 to provide adequate space for the call 300 to be placed. This functionality could also include the ability to increase the call 300 service rate if, for instance, the pre-degraded call 300 service rate became available due to the intra-cell hand-off.

Reference is now made to FIGS. 4A–4D wherein there are illustrated four example executions of the Multi-Full Rate Channel Assignment Process (MFRCAP) of FIG. 3A. Each of the examples is intended to illustrate specific paths and procedures within the MFRCAP. Note that the examples show an IS-136 time slot structure. The invention also applies to any TDMA system.

Figure 4A:
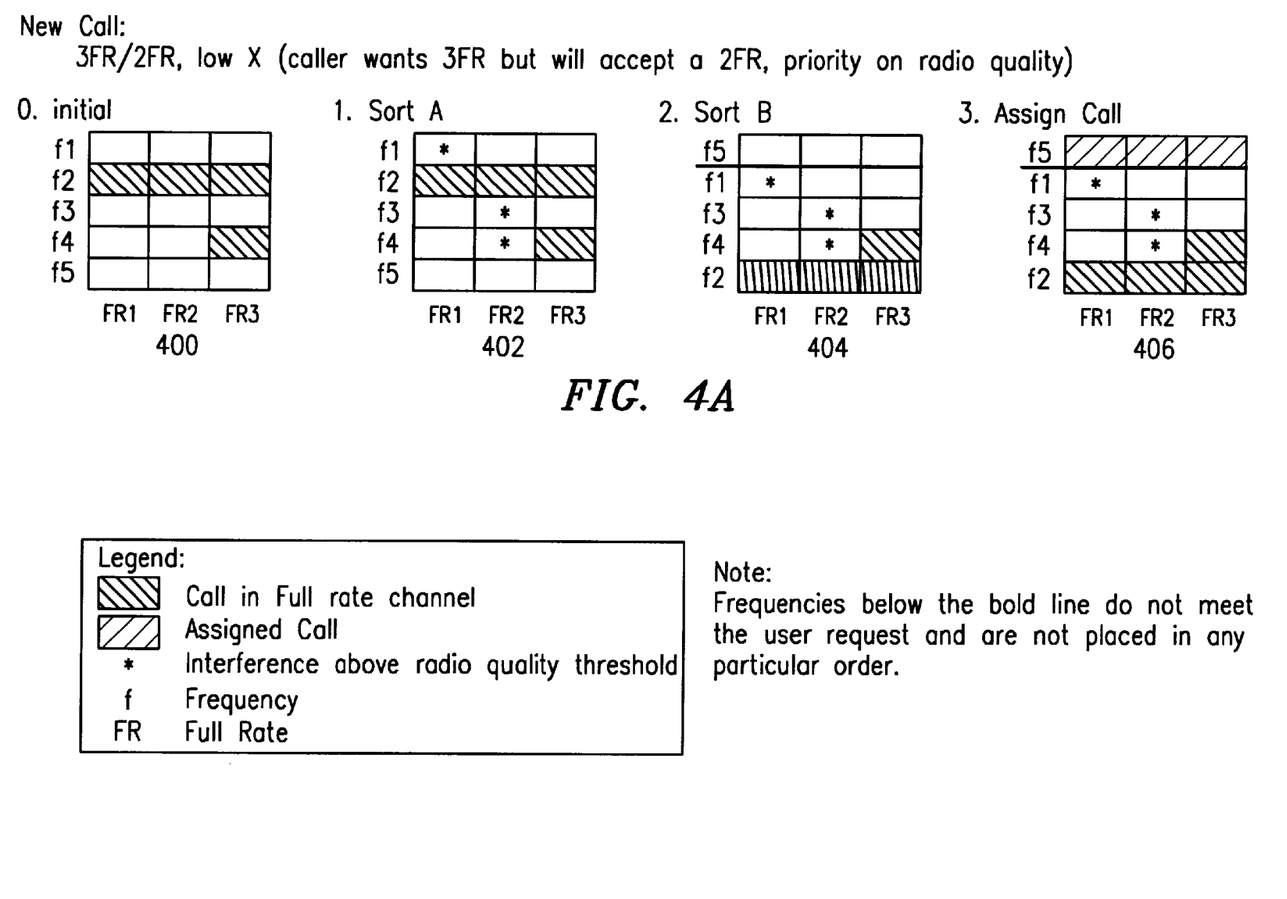
FIGS. 4A–4D illustrate four example executions of the multi-full rate channel assignment process of FIG. 3A.

Referring to FIG. 4A, a call 300 is requested. The call 300 specifies a triple full rate (3FR) service rate request, but will accept a double full rate (2FR) minimum service rate. In addition, the priority parameter X places a priority on the radio quality (i.e., the metrics such as minimum interference, power levels, time slot usage are proper for certain level of radio quality) rather than satisfying requested service rates. FIG. 4A depicts four frequency channel structures (FCS), which illustrate the MFRCAP process consideration of the frequencies within the cell. Each frequency channel structure contains five frequency channels ($f_1$–$f_5$) and each frequency channel has three FR channels ($FR_1$–$FR_3$).

An initial frequency channel structure 400 presents the calls that reside on particular FR channels within the cellular system at the time the call 300 is requested by representing the occupied FR channels as shaded boxes. FCS 400 further shows frequency $f_2$ with all three FR channels having calls residing in them and frequency $f_4$ having a call residing in $FR_3$. It should be noted that frequency $f_2$ may contain a 3FR call, a FR and 2FR call, or three FR calls to fill the three FR channels within the frequency. For the purposes of the example embodiments in FIGS. 4A–4D, $f_2$ contains a 3FR call at the call 300 request time.

In response to the call 300, a FR channel sort (Sort A) in step 310 is performed and the results are shown in FCS 402. The FR channel sort in step 310 identifies the plurality of FR channels in the cell that meet the service type of the call 300 below an operator allowed cost threshold related to the radio conditions using IDCS or another metric-based quality channel selection method known in the art. FCS 402 depicts vacant FR channels that are unacceptable to the cost threshold with an asterisk (*). FR channels with no markings are vacant and below the interference cost threshold identified in step 310. However, upon the sort in step 310 finding an FR channel with a cost above the cost threshold, the sort considers the entire frequency channel unavailable for further channel selection consideration. The frequencies $f_1$, $f_3$, and $f_4$ are therefore unavailable for further channel selection consideration.

The multi-full rate channel sort (Sort B) is next performed in step 320 to sort the available FR channels identified in step 310 into multi-full rate channel combinations that meet the requested service rate. Step 320 logically determines whether a frequency channel has enough FR channel capacity to meet the requested service rate. FCS 404 shows the results of step 320 by placing a bold line beneath frequencies that meet the requested service rate. Frequencies below the bold line do not meet the requested service or are deemed unavailable due to a cost above the cost threshold as identified in step 310. Frequencies below the bold line in the example embodiments are listed in no particular order as the ordering would be dependent upon the particular sort logic employed in steps 310 and 320.

FCS 406 displays the results of steps 330 and 340. Step 330 returned an affirmative result as at least one multi-full rate channel existed that could support the call 300, frequency channel $f_5$. Step 340 is a process that assigns the call 300 to the frequency that has the lowest cost associated with it based upon the IDCS function or some other metric-based quality channel selection function known in the art. Step 340, in the FCS 406 configuration, assigns the call 300 to frequency $f_5$ since $f_5$ is the only frequency available to handle the 3FR call.

If, for example, the call 300 had a service rate request for a double full rate call, the sort B would have sorted frequency $f_5$ into three 2FR channel selections, $f_5$-($FR_1$, $FR_2$), ($FR_1$,$FR_3$), and ($FR_2$,$FR_3$). Note that the $f_5$-($FR_1$,$FR_3$), option is only available in cellular systems that allow calls to be assigned to non-contiguous full rate channels. The minimum of the sum of the 2FR costs would have been assigned the 2FR call 300 by step 340, (assuming that full rate level cost measurements and analysis can be performed).

Figure 4B:
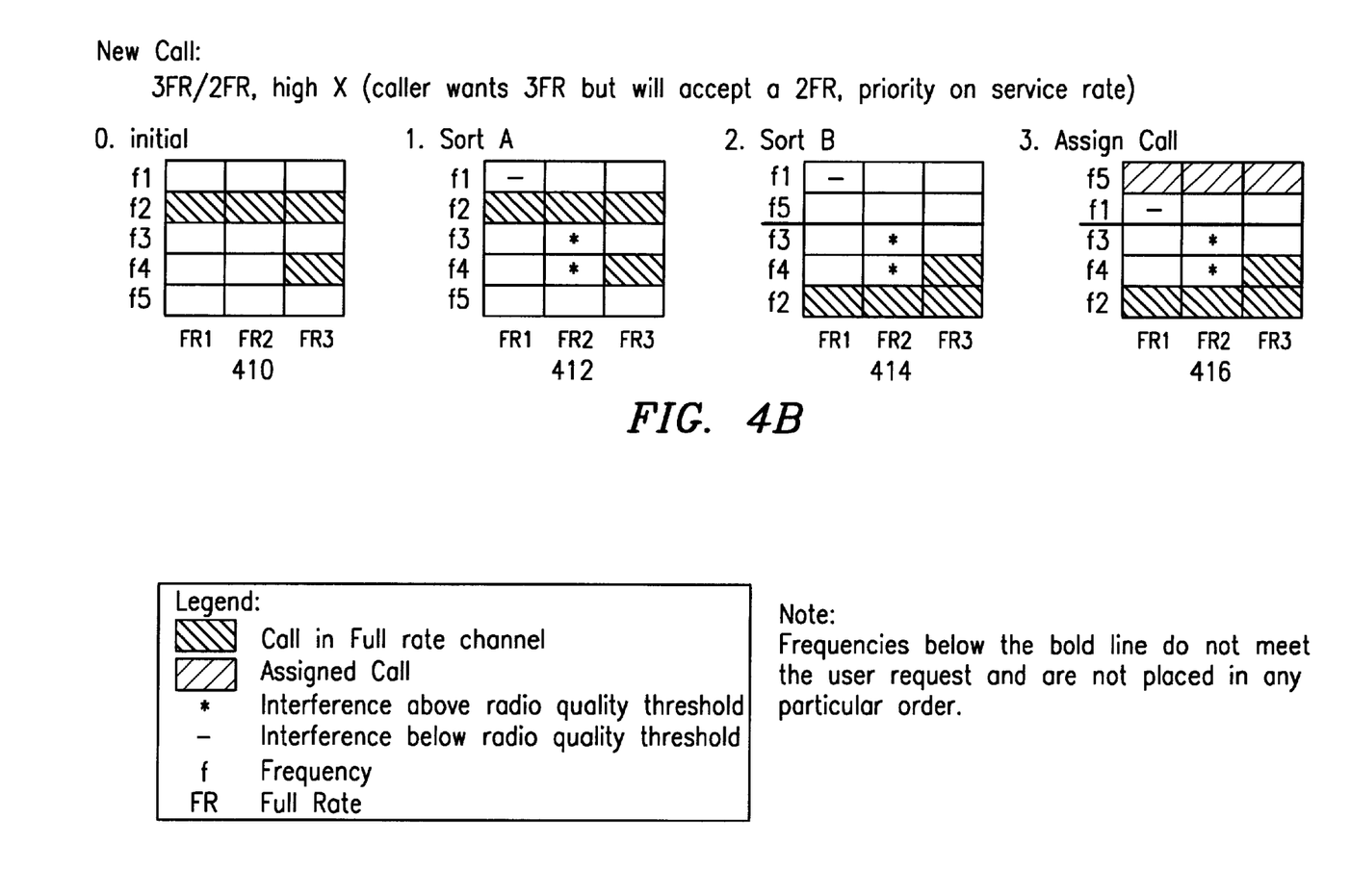

Referring to FIG. 4B, the call 300 requested in this example requests a 3FR, but will accept a 2FR and has selected a high X placing a priority on satisfying service requests rather than radio quality. This example shows the difference when the priority is placed on providing service rather than radio quality. The FIG. 4B FCS 410 is the same as FIG. 4A FCS 400 for the initial FCS configuration.

In response to the call 300, a FR channel sort in step 310 is performed and the results are shown in FCS 412. FCS 412 shows that frequency $f_1$ contains a dash (-) rather than an asterisk as was the case in FCS 402. The dash in FCS 412 in frequency $f_1$-$FR_1$ channel represents a cost that is acceptable with the high X value in FIG. 4B, but unacceptable with the low X value in FIG. 4A. Because the priority was placed on providing service rather than the radio quality, the cost threshold was raised thereby allowing the acceptable radio quality to be lowered. In other words, a high X value parameter will allow the call to be placed onto a channel with worse cost levels, such as higher interference levels, lower power levels, or higher time slot usage. Such a priority on service rate allows for degraded metric values. The sort in step 310 was performed on FCS 300 to identify the FR channels that meet the requested service type below the operator allowed cost threshold related to the radio conditions. The results are shown in FCS 412.

FCS 414 shows the results of Sort B in step 320. Because step 310 produced two frequencies having enough FR channel capacity to meet the service rate request with acceptable cost levels, frequencies $f_1$ and $f_5$, step 320 sorts FCS 414 so that the frequencies $f_1$ and $f_5$ are above the bold line. The request rate logic in step 330 determines from multi-full rate channel combinations identified in step 320, shown in FCS 414, the available multi-full rate channels that can support the call 300. FCS 414 contains two such multi-full rate channels, $f_1$ and $f_5$. Because at least one multi-full rate channel exists that can support the call 300, step 340 is employed and its process assigns the call 300 into the number of requested FR channels in the frequency having the lowest cost. FCS 416 shows that frequency channel $f_5$ has a lower cost than $f_1$ so step 340 assigns the call into $f_5$. Had $f_5$ not been available, the call 300 would have been placed into $f_1$ as a 3FR because, assuming interference was the only metric of concern, even though interference existed in $f_1$–$FR_1$, the interference level was below the operator allowed cost threshold.

Figure 4C:
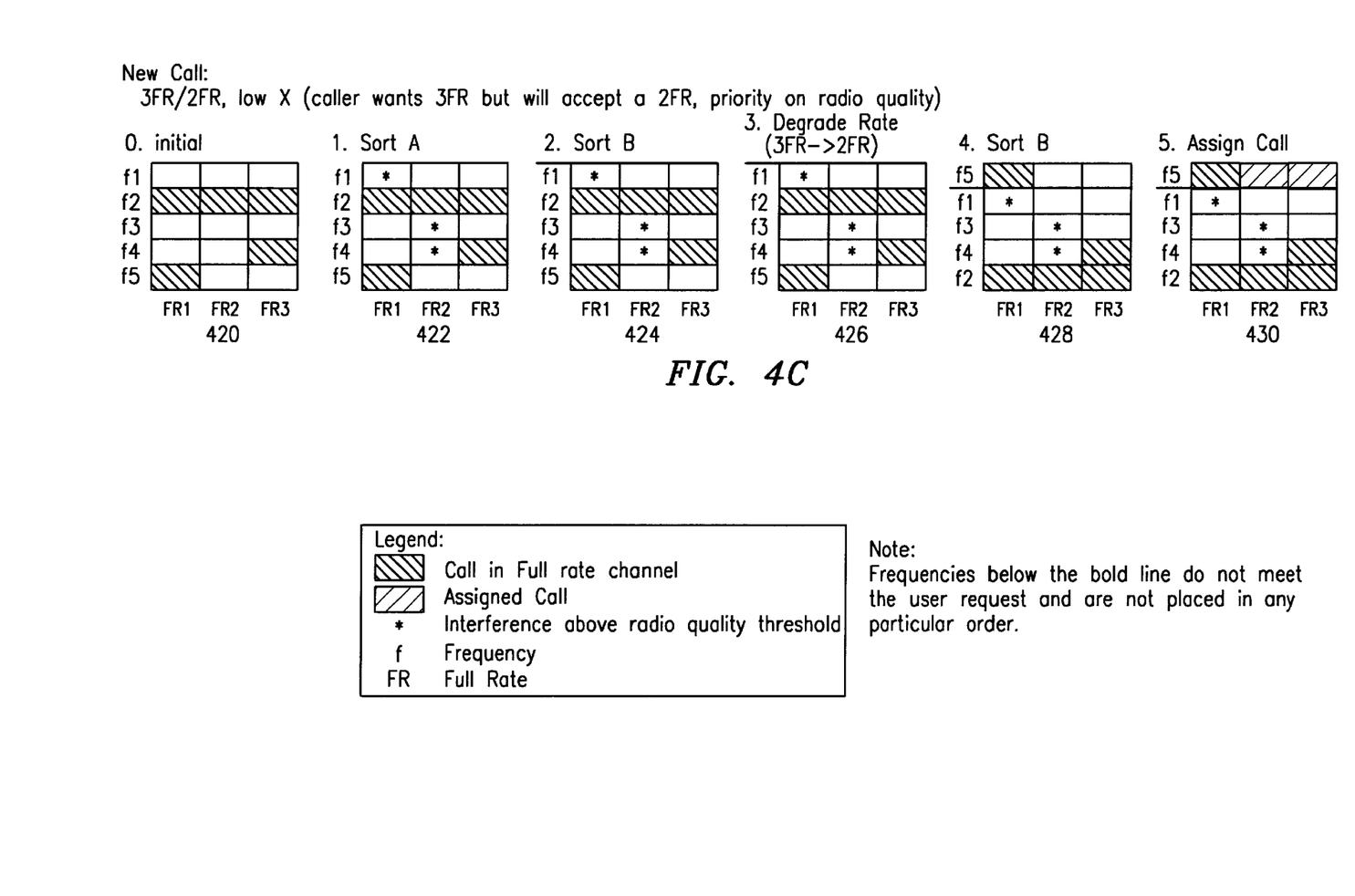

Referring to FIG. 4C, the call 300 has the same parameters as FIG. 4A, 3FR/2FR and low X. FCS 420 is modified from FIGS. 4A and 4B to have a busy FR channel on frequency $f_5$.

In response to the call 300, a FR channel sort in step 310 is performed. The results of the FR channels in FCS 420 that meet the service type of the call 300 below the operator allowed cost threshold related to the radio conditions using IDCS or another metric-based quality channel selection method known in the art are shown in FCS 422. The multi-full rate channel sort of step 320 sorts the FR channels identified by the FR sort of step 310, shown in FCS 422, into multi-full rate channel combinations that meet the requested service rate. In this case, there are no frequencies that meet the call 300 parameters so the bold line is placed at the top of FCS 424 and the MFRCAP proceeds to step 350 to determine if the call 300 request has reached the minimum acceptable service rate level. Since the minimum acceptable service rate for the call 300 can be 2FR, the call 300 service rate is degraded to the next acceptable level (i.e., 2FR) in step 360. FCS 426 remains the same as FCS 424.

Following the call 300 service rate being reduced, the MFRCAP proceeds to step 320, where Sort B is repeated to sort the multi-full rate channel combinations that meet the requested service rate. FCS 428 displays the results of Sort B. Frequency $f_5$ is the only frequency that meets the requested service rate as both $f_5$-$FR_2$ and $FR_3$ are available and below the cost level of the operator cost threshold. The request rate logic 330 determines that at least one multi-full rate channel exists that can support the call 300 so the MFRCAP proceeds to step 340. Step 340 assigns the channel combination with the lowest cost to carry the call 300, shown in FCS 430.

Figure 4D:
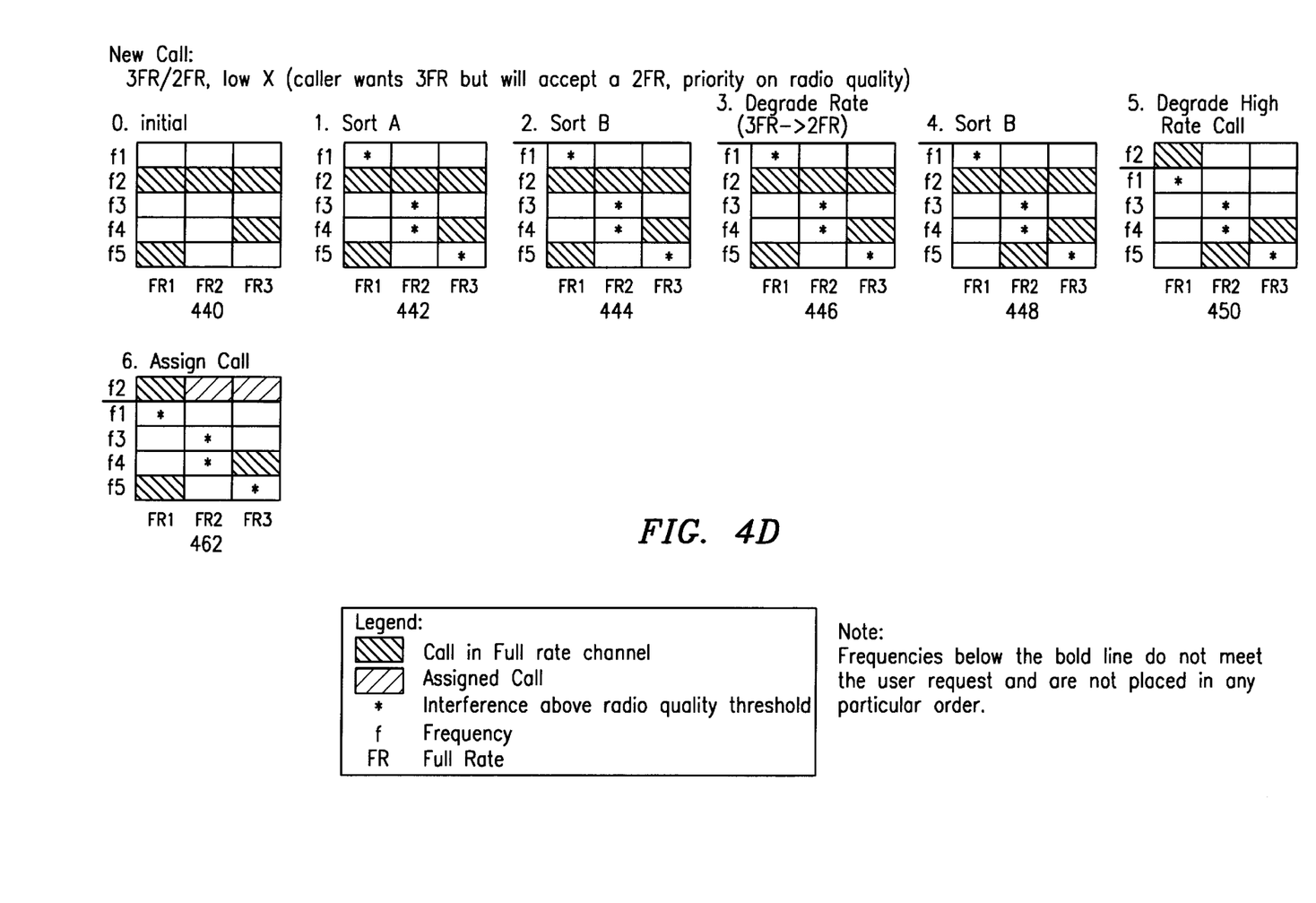

Reference is now made to FIG. 4D. The call 300 has the same parameters as the calls in FIGS. 4A and 4C (i.e., 3FR/2FR and low X-priority on radio quality). The initial FCS 440 configuration is the same as FIG. 4C FCS 420. The results of the FR channel sort of step 310 to sort the FR channels that meet the requested service type below the operator allowed cost threshold related to the radio conditions are shown in FCS 442. This example has cost metric values above the operator allowed cost threshold in each frequency channel with available FR channels. Because of the cost levels being above the operator allowed cost threshold, Sort B in step 320 finds no multi-full rate channel combinations that meet the requested service rate, so the bold line is placed at the top of the FCS 444.

The request rate logic in step 330 returns a negative result and the minimum rate logic is employed in step 350. The minimum rate logic 330 determines that the call 300 service rate has not reached the minimum acceptable level and the MFRCAP proceeds to step 360. Step 360 degrades the service rate of call 300 from 3FR to 2FR and the FCS 446 is unchanged from FCS 444.

The multi-full rate channel sort of step 320 is repeated to perform the Sort B procedure to sort the multi-full rate channel combinations that meet the requested service rate. However, due to poor metric-based quality levels on (idle) FR channels, no multi-full rate channel combinations are available for the call 300 (as demonstrated by the bold line in FCS 448 being above all frequency channels).

The request rate logic in step 330 returns a negative result because no channel combinations meeting the requested service rate are found. Step 350 is repeated and determines that the minimum acceptable service rate (2FR) has been reached. A positive result is returned and MFRCAP proceeds to step 370. Step 370 contains logic to determine if any high rate calls that meet the service type and that are below the cost threshold currently in the servicing cell 10 can be degraded. Because step 370 finds an existing call on frequency channel $f_2$ that originally set its minimum acceptable service rate parameter to FR, step 380 is performed to degrade the existing high rate call. Had the existing call in $f_2$ had its minimum acceptable service rate parameter set to 3FR, MFRCAP would have proceeded to step 390 and the call would have been dropped.

Step 380 degrades the high rate call with the lowest cost associated. Since frequency $f_2$ is the only degradable high rate call, the high rate call in $f_2$ is degraded to a single FR call and the results of step 380 are depicted in FCS 450 with the bold line below $f_2$. The degrading of the existing high rate call on $f_2$ to a single FR channel makes $f_2$ available for the 2FR call 300. Step 340 assigns the call 300 with the reduced service rate, 2FR, into frequency $f_2$ full rate channels $FR_2$ and $FR_3$, seen in FCS 452.

Figure 4E:
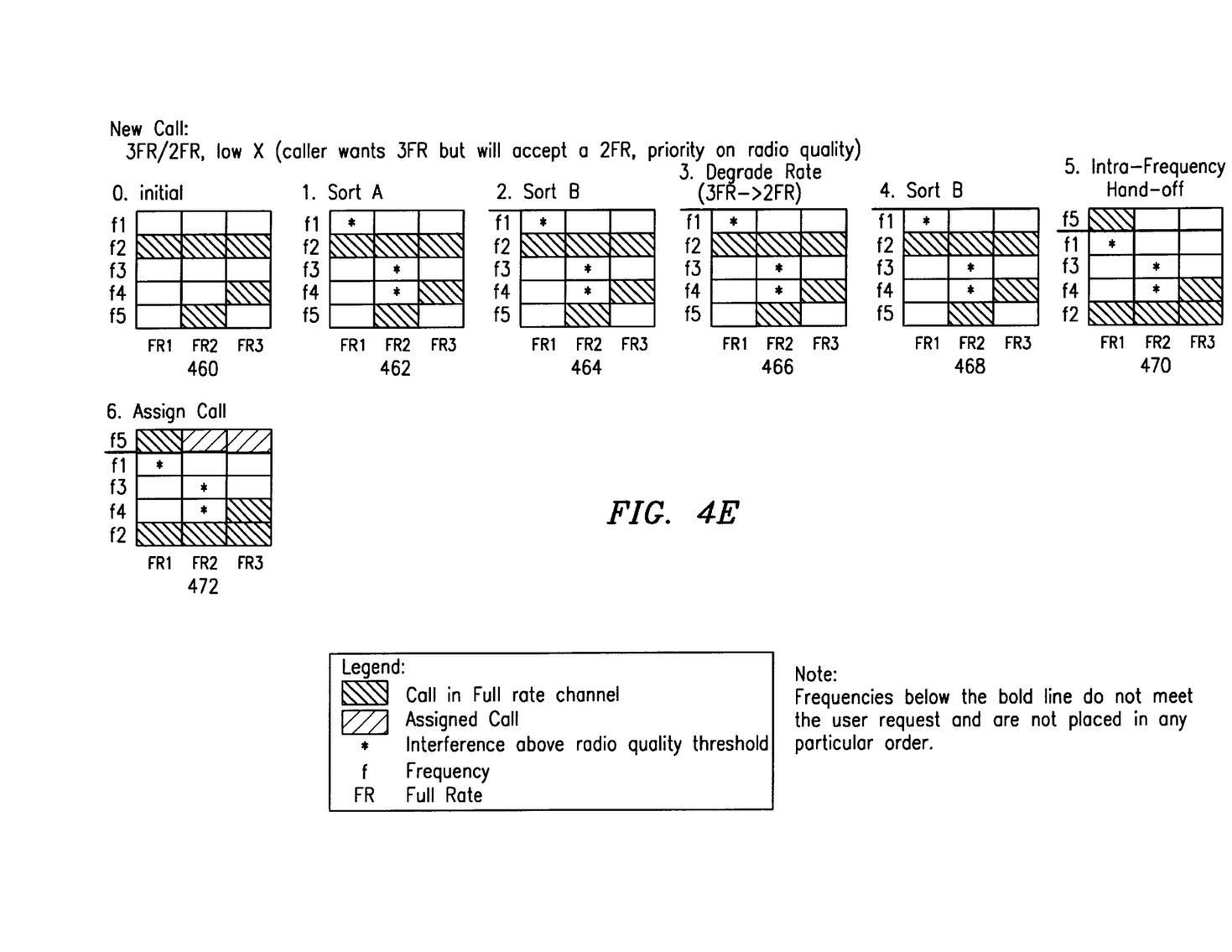
FIG. 4E illustrates an example execution of the multi-full rate channel assignment process of FIG. 3B.

Reference is now made to FIG. 4E wherein there is illustrated an example execution of the MFRCAP (second embodiment) of FIG. 3B. The initial call configuration is shown in FCS 460 and is the same as FIG. 4C with the notable exception of frequency $f_5$ having an existing call located in the $FR_2$ full rate slot. The full rate channel sort of step 310 is performed and the full rate cells that have cost values above the operator allowed cost threshold are marked with an asterisk in FCS 462. The multi-full rate channel sort of step 320 is performed with the result of having no frequencies available to support the 3FR call 300 in FCS 464.

Step 332 determines that no intra-cell or intra-frequency hand-offs can be performed to meet the 3FR call 300. Note that if the intra-cell hand-off method utilized allowed for a call to be placed on a frequency having a high cost, the existing FR call in $f_5$–$FR_2$ could have been relocated to $f_1$, $f_3$, or $f_4$ and the 3FR call 300 requested placement could have been made. The call 300 is then degraded from a 3FR to a 2FR in step 350 shown in FCS 466. The multi-full rate sort in step 320 is performed and FCS 468 shows that $f_5$ meets the 2FR requirement for the call 300. In a cellular system that can support a non-contiguous call placement (i.e., a 2FR in $f_5$–$FR_1$,$FR_3$), the call 300 could be placed, however, this example assumes that the cellular system requires calls to be placed in contiguous full rate channels.

Step 330 determines that no contiguous channel combination can be found and is shown in FCS 468. Step 432 determines that an intra-frequency hand-off can be made to provide adequate contiguous full rate availability on frequency channel $f_5$. This intra-frequency hand-off of step 434 is shown in FCS 470 by having the existing call be moved from $f_5$-$FR_2$ to $f_5$-$FR_1$. The call 300 is then placed into the two contiguous full rate channels of $f_5$ by step 340 and shown in FCS 472.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for use in a cellular telephone system for assigning a multi-full rate channel combination of traffic channels to a request for a call, comprising the steps of:

performing a full rate channel sort to identify available full rate channels that meet a certain service type for the call below an operator allowed cost threshold related to radio conditions;

performing a multi-full rate channel sort on the identified full rate channels found in the full rate channel sort to identify multi-full rate channel combinations that meet a certain service rate for the call; and assigning the call to one of the identified multi-full rate channel combinations by:
  determining whether at least one multi-full rate channel combination meets the requested service rate by:
    determining that no multi-full rate channel combinations as identified by the multi-full rate channel sort meet the requested service rate;
    determining that the requested service rate for the call has not reached the minimum acceptable service rate level;
    degrading the requested service rate of the call to a next available lower service rate level;
    performing the multi-full rate channel sort process again on the identified full rate channels found in the full rate channel sort to identify multi-full rate channel combinations that meet the degraded service rate; and
  assigning the call to one of the multi-full rate channel combinations identified by the multi-full rate channel sort.

2. A method for use in a cellular telephone system for assigning a multi-full rate channel combination of traffic channels to a request for a call, comprising the steps of:

performing a full rate channel sort to identify available full rate channels that meet a certain service type for the call below an operator allowed cost threshold related to radio conditions;

performing a multi-full rate channel sort on the identified full rate channels found in the full rate channel sort to identify multi-full rate channel combinations that meet a certain service rate for the call; and assigning the call to one of the identified multi-full rate channel combinations by:
  determining whether at least one multi-full rate channel combination meets the requested service rate by:
    determining that the requested service rate for the call has reached the minimum acceptable level;
    determining that an existing high service rate call can be degraded;
    degrading an existing high service rate call to a lower available service rate level to free up one or more full rate channels; and
    assigning the call to a multi-full rate channel combination including the freed up one or more full rate channels.

3. The method as in claim 2 wherein the step of determining that an existing high service rate can be degraded further comprises the steps of:

determining that no high service rate calls can be degraded; and dropping the call request.

4. The method as in claim 2 wherein determining that an existing high service rate call can be degraded further comprises:

determining whether any existing high rate calls meet the service type of the requested call; and determining whether the frequency containing the existing call has a cost below an operator allowed cost threshold.

5. The method as in claim 2 wherein degrading further comprises the steps of:

determining whether an intra-cell hand-off can be performed to provide adequate full rate availability; and increasing the call service rate to the maximum full rate availability.

6. The method as in claim 2 wherein the existing high service rate call is an existing call having a lower cost than all existing high service rate calls.

7. A method for use in a cellular telephone system for assigning a multi-full rate channel combination of traffic channels to a request for a call, comprising the steps of:

performing a fill rate channel sort to identify available full rate channels that meet a certain service type for the call below an operator allowed cost threshold related to radio conditions;

performing a multi-full rate channel sort on the identified full rate channels found in the full rate channel sort to identify multi-full rate channel combinations that meet a certain service rate for the call; and assigning the call to one of the identified multi-full rate channel combinations by:
  determining whether an intra-cell or intra-frequency hand-off can be performed to provide adequate full rate channel availability for assigning the call;
  performing the intra-cell or intra-frequency hand-off; and
  assigning the call to a multi-full rate channel combination including full rate channels made available by the intra-cell or intra-frequency hand-off.

8. A method for use in a cellular telephone system for assigning a traffic channel to a request for a call comprising the steps of:

performing a full rate channel sort to identify available full rate channels that meet a certain service type for the call below an operator allowed cost threshold related to radio conditions;

performing a multi-full rate channel sort on the identified full rate channels found in the full rate channel sort to identify multi-full rate channel combinations that meet a certain service rate for the call;

determining that the certain service rate for the call cannot be accommodated with existing available multi-full rate channel combinations;

degrading the certain service rate of the call to a next available service rate level;

performing a multi-full rate channel sort on the identified full rate channels found in the full rate channel sort to identify new multi-full rate channel combinations that meet the degraded service rate for the call; and assigning the call to one of the identified new multi-full rate channel combinations.

9. The method as in claim 8 further comprising the step of determining that no intra-cell or intra-frequency hand-off can be performed to provide adequate full rate availability.

10. The method as in claim 8 wherein the certain service rate further comprises a parameter that defines a requested service rate.

11. The method as in claim 8 wherein the certain service rate further comprises a parameter that defines a minimum acceptable service rate.

12. The method as in claim 8 wherein the allowed cost threshold is a parameter controlled by the operator.

13. The method as in claim 10 wherein the step of assigning comprises the steps of:

determining whether at least one multi-full rate channel combination meets the requested service rate; and assigning the call to that multi-full rate channel combination.

* * * * *

UNITED STATES PATENT AND TRADEMARK OFFICE
CERTIFICATE OF CORRECTION

PATENT NO.    : 6,295,453 B1
DATED         : September 25, 2001
INVENTOR(S)   : Desgagne et al.

It is certified that error appears in the above-identified patent and that said Letters Patent is hereby corrected as shown below:

Column 4,
Line 44, delete "." after the word "does"

Column 14,
Line 50, replace "fill" with -- full --

Signed and Sealed this

Twelfth Day of March, 2002

Attest:

JAMES E. ROGAN
Director of the United States Patent and Trademark Office

*Attesting Officer*